US007697918B2

(12) United States Patent
Mitsuhashi et al.

(10) Patent No.: US 7,697,918 B2
(45) Date of Patent: Apr. 13, 2010

(54) BROADCAST APPARATUS FOR CLOSED SPACE

(75) Inventors: Masaru Mitsuhashi, Tokyo (JP); Hideki Nagao, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 550 days.

(21) Appl. No.: 11/518,999

(22) Filed: Sep. 12, 2006

(65) Prior Publication Data

US 2007/0182585 A1 Aug. 9, 2007

(30) Foreign Application Priority Data

Feb. 7, 2006 (JP) ............................ 2006-030309
Aug. 10, 2006 (JP) ............................ 2006-218469

(51) Int. Cl.
*H04M 11/04* (2006.01)

(52) U.S. Cl. .................... 455/404.1; 455/11.1; 455/69; 455/522; 370/293; 370/279

(58) Field of Classification Search ................ 455/3.01, 455/3.02, 7, 11.1, 39, 522, 67.11, 68, 69, 455/404.1; 370/226, 293, 246, 274, 279, 370/315, 316, 492, 501
See application file for complete search history.

(56) References Cited

U.S. PATENT DOCUMENTS 5,689,804 A * 11/1997 Sugita et al. .................. 455/14
2003/0128850 A1* 7/2003 Kimura et al. ................ 381/82
2006/0025154 A1* 2/2006 Alapuranen et al. ...... 455/456.1
2007/0010276 A1* 1/2007 Kanada et al. .............. 455/522

FOREIGN PATENT DOCUMENTS

| | | |
|---|---|---|
| GB | 2418803 | 2/2008 |
| JP | 56-6153 | 6/1981 |
| JP | 4-273625 | 9/1992 |
| JP | 9-191276 | 7/1997 |
| JP | 2001-243578 | 9/2001 |

OTHER PUBLICATIONS http://www.geocities.co.jp/Technopolis/1549/kinkei.htm entitled "What is emergency warning system (EWS)?" and retrieved on Sep. 22, 2006.

(Continued)

*Primary Examiner*—Duc Nguyen
*Assistant Examiner*—Dominic E Rego
(74) *Attorney, Agent, or Firm*—Finnegan, Henderson, Farabow, Garrett & Dunner, L.L.P.

(57) ABSTRACT

When a tunnel has no problem therein, a reception wave of a broadcast is retransmitted into the tunnel. At this moment, terminal registers prevent a retransmission signal from leaking from the tunnel and do not influence an adverse effect to a broadcast wave outside the tunnel. When an accident occurs in the tunnel, sensors sense this fact, and a monitoring center issues an emergency operation instruction to broadcast equipment for an emergency. At this moment, the broadcast equipment stops the retransmission of the reception wave to broadcast emergency alarm information into the tunnel and also controls transmitting antennas to emit broadcast signals to broadcast the alarm information also nearby tunnel mouths.

3 Claims, 1 Drawing Sheet

OTHER PUBLICATIONS

Decision of Rejection mailed Feb. 10, 2009, in Japanese Patent Application No. 2006-218469 and English-language translation thereof.

Notice of Reasons for Rejection, mailed Aug. 5, 2008, in Japanese Patent Application No. 2006-218469 (3 pages).

English-language translation of Notice of Reasons for Rejection, mailed Aug. 5, 2008, in Japanese Patent Appliation No. 2006-218469 (4 pages).

Official Action dated Jan. 6, 2010, issued in corresponding Canadian Patent Application No. 2,559,443.

* cited by examiner

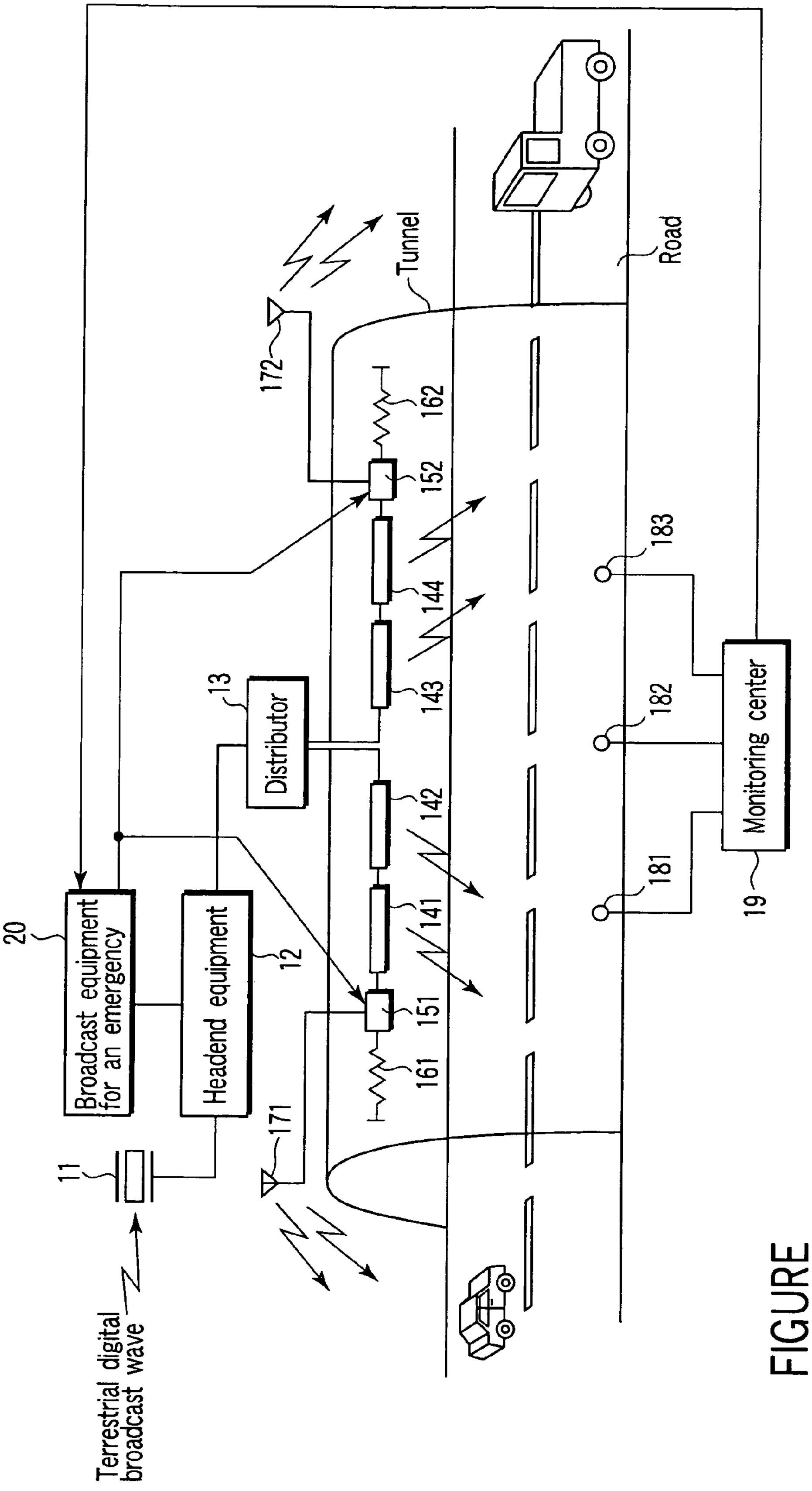
FIGURE

BROADCAST APPARATUS FOR CLOSED SPACE

CROSS-REFERENCE TO RELATED APPLICATIONS

This application is based upon and claims the benefit of priority from prior Japanese Patent Applications No. 2006-030309, filed Feb. 7, 2006; and No. 2006-218469, filed Aug. 10, 2006, the entire contents of both of which are incorporated herein by reference.

BACKGROUND OF THE INVENTION

1. Field of the Invention

The present invention relates to a broadcast apparatus for a closed space which is used, for instance, in a terrestrial digital broadcast system to retransmit a broadcast signal into a closes space such as a tunnel and an underground mall. More specifically, the invention relates to a technology to accurately and quickly broadcast emergency information such as disaster information and disaster prevention information.

2. Description of the Related Art

In a conventional analog broadcast system, in the case of an occurrence of an emergency situation in a limited space (hereinafter referred to as closed space), since the broadcast system performs an emergency broadcast which broadcasts emergency information only within the closed space, it turns into a grave problem. For example, in the case of an occurrence of an accident in a tunnel, the broadcast system broadcasts the emergency broadcast only within the tunnel. At this moment, the broadcast system displays the emergency information on an electronic bulletin board disposed at this side of the tunnel to alert drivers of vehicles traveling toward the tunnel. However, in such a manner, if the drivers miss out the display, or if the drivers have already passed through the set place of the bulletin board, the drivers do not become aware of the accident in the tunnel at this side of the tunnel and enter the tunnel, never to come to know the accident, and such a situation becomes a cause of a secondary accident.

By the way, specifications of a terrestrial digital broadcast now having come into wide use currently define only first class start (earthquake warning) and second class start (tidal wave warning) as conditions to perform an emergency warning broadcast, because the defined specifications have taken over the specifications of the conventional terrestrial analog broadcast.

On the other hand, in a broadcast field, a technology to broadcast new type of emergency information such as an emergency earthquake prompt report has been developed. However, as matters now stand, the technology which has been under development is still not matched not only to the new type of emergency information but also municipality local disaster prevention information which has been transmitted in the disaster prevention radio system and the emergency broadcast in a closed space.

Now, as for this kind of the emergency broadcast, the Web site of http://www.geocities.co.jp/Technopolis/1549/kinkei.thm# jissi "What is emergency warning system (EWS)?" discloses it in detail.

As mentioned above, although the broadcast apparatus for the closed space has been expected as an accurate and quick notification means for the emergency information, the broadcast apparatus has been in a state that it cannot sufficiently respond to expectations yet.

BRIEF SUMMARY OF THE INVENTION

An object of the present invention is to provide a broadcast apparatus for a closed space capable of accurately and quickly notifying emergency information in a broadcast toward a closed space.

The broadcast apparatus for the closed space regarding the present invention comprises a reception means for receiving a normal broadcast signal; a broadcast apparatus for an emergency which generates emergency information to transmit it as an emergency broadcast signal; and a transmission means for retransmitting the normal broadcast signal received by the reception means to transmit the emergency broadcast signal transmitted from the broadcast apparatus for the emergency within the closed space, instead of the normal broadcast signal in an emergency.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

The single FIGURE is an exemplary schematic configuration view showing an embodiment of a broadcast apparatus for a closed space regarding the present invention.

DETAILED DESCRIPTION OF THE INVENTION

Hereinafter, an embodiment of the present invention will be described in detail with reference to the drawing.

FIG. 1 is a block diagram showing a configuration when a broadcast apparatus for a closed space regarding the present invention is employed to a broadcast apparatus in a tunnel. In FIG. 1, a receiving antenna 11 receives a terrestrial broadcast wave. As for the terrestrial broadcast wave, a wave for any of an AM broadcast, an FM broadcast, an analog television broadcast and a terrestrial digital broadcast is available. A broadcast signal received by the receiving antenna 11 is subjected to auto gain control (AGC) processing, waveform equalization processing and demodulation processing by headend equipment 12 to be supplied to a distributor 13, and then it is distributed to, for instance, transmitting antenna groups 141-144 connected from the center of the tunnel toward each mouth of uplink and downlink directions. Terminal registers 161 and 162 are connected to opposed ends of the transmitting antenna groups 141-144 though switches 151 and 152, respectively, so that broadcast signal retransmission waves are not leaked outside the tunnel usually.

Sensors 181-183 such as monitors or fire alarms are installed in the tunnel, and these are managed by a monitoring center 19. When any one of each sensor 181-183 detects an abnormality, the monitoring center 19 grasps the detail immediately and also instructs an execution of an emergency operation mode to broadcast equipment for an emergency 20. When receiving an execution instruction of an emergency operation mode, the broadcast equipment 20 notifies prescribed emergency alarm information in an emergency to the headend equipment 12 to transmit the emergency alarm information as a substitute of a broadcast signal. Simultaneously, the broadcast apparatus switches over the switches 151 and 152 from the sides of the terminal registers 161 and 162 to the sides of the transmitting antennas 171 and 172, respectively. These transmitting antennas 171 and 172 are installed nearby the tunnel mouths on uplink and downlink lines so as to transmit the broadcast waves.

In other words, when there is no trouble in the tunnel, the broadcast apparatus with the aforementioned configuration retransmits a reception wave of a broadcast. At this moment, the terminal registers 161 and 162 prevent the retransmitted signal from being leaked outside the tunnel so as not to influence adverse effects on the broadcast wave outside the tunnel.

In the case of an occurrence of an accident in the tunnel, the sensors 181-183 senses the fact, and the monitoring center 19 issues the execution instruction of the emergency operation mode to the broadcast equipment 20. Therefore, the retransmission of the reception wave is stopped and the emergency alarm information transmitted from the broadcast equipment 20 is broadcast within the tunnel. At this moment, the broadcast equipment 20 controls the transmitting antennas 171 and 172 to transmit the broadcast signal, so that the emergency alarm information is broadcast also nearby the tunnel mouths. As a result, it becomes possible to notify the emergency alarm information to vehicles before entering the tunnel and to prevent secondary accident.

Meanwhile, in normal times, the headend equipment 12 retransmits the broadcast signal received by the antenna 11 on the ground, and when receiving the execution instruction of the emergency operation mode from the broadcast equipment 20, the headend equipment 12 shuts down the reception signal (hereinafter referred to as normal broadcast signal) and transmits emergency alarm information by an emergency microphone/camera on a signal with the same form of the broadcast signal (hereinafter referred to as emergency broadcast signal). In this case, the headend equipment 12 controls a power amplifier so as to increase output power in an emergency stronger than output power in normal times. That is, in normal times, the headend equipment 12 transmits the normal broadcast signal at rated power, and in an emergency, it increases the output power stronger than that of in normal times to transmit the emergency broadcast signal. Thereby, the broadcast equipment 20 can receive the emergency broadcast signal even in an area adjacent to the transmission area and prevent the vehicle from entering the area where the emergency situation has occurred.

For instance, in the case of the AM broadcast, the AM broadcast wave of the emergency broadcast signal is set to an electric field strength higher than that of the AM broadcast wave of the normal broadcast signal by not lower than 35 dB. Thereby, even in an adjacent area, an AM receiver can suppress the AM wave of the normal broadcast signal and receive the AM wave of the emergency broadcast signal. And in the case of the FM broadcast, the FM broadcast wave of the emergency broadcast signal is set to a power strength stronger than that of the FM broadcast wave of the normal broadcast signal by not weaker than 6 dB by utilizing a capture effect. Thereby, even in the adjacent area, an FM receiver can suppress the FM wave of the normal broadcast signal and receive the FM wave of the emergency broadcast signal. Further, in the case of the terrestrial digital broadcast wave (64 QAM-convolution coding 7/8 of OFDM system), the broadcast wave of the emergency broadcast signal is set to a power strength stronger than that of the broadcast wave of the normal broadcast signal by not weaker than 20 dB. Thereby, even in the adjacent area, the terrestrial digital broadcast receiver can suppress the broadcast wave of the normal broadcast signal of the terrestrial digital broadcast and receive the broadcast wave of the emergency broadcast signal.

When transmitting the emergency broadcast signal toward the outside of the tunnel, the broadcast equipment 20 transmits the emergency broadcast signal onto, for instance, an express way. In contrast, so that the transmission of the emergency broadcast signal does not interfere with, for instance, the adjacent area on the opposed side of the express way, the broadcast equipment 20 retransmits the normal broadcast signal toward the area adjacent to the express way.

For instance, in the case of the AM broadcast, the AM broadcast retransmission wave of the normal broadcast signal is set to the electric field strength higher than that of the AM broadcast wave of the emergency broadcast signal by 35 dB or more. Therefore, in the adjacent area, the AM receiver can suppress the AM wave of the emergency broadcast signal and receive the AM wave of the normal broadcast signal. In the case of the FM broadcast, the FM broadcast retransmission wave of the normal broadcast signal is set to the power strength higher than that of the FM broadcast wave of the emergency broadcast signal by 6 dB or more by utilizing the capture effect. Thereby, even in adjacent area, the FM receiver can suppress the FM wave of the emergency broadcast signal and receive the FM wave of the normal broadcast signal. In the case of the terrestrial digital broadcast wave (64 QAM-convolution coding 7/8 of OFDM system), the broadcast wave of the normal broadcast signal is set to a power strength stronger than that of the broadcast wave of the emergency broadcast signal by 20 dB or more. Thus, even in the adjacent area, the terrestrial digital broadcast receiver can receive the broadcast wave of the normal broadcast signal by suppressing the broadcast wave of the emergency broadcast signal of the terrestrial digital broadcast.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A broadcast apparatus for a closed space, comprising:

a first antenna which transmits a broadband signal in the closed space which has an open mouth;

a second antenna which transmits a broadband signal outside of the closed space;

a receiver which receives a normal broadcast signal;

a generator which generates a retransmit broadcast signal based on the normal broadcast signal received by the receiver and generates an emergency broadcast signal when an emergency alarm information is provided in a case abnormality is detected in the closed space; and a transmitter which usually transmits the retransmit broadcast signal from the first antenna by rated power, and transmits the emergency broadcast signal from the first antenna by high power than rating and transmits the emergency broadcast signal from the second antenna when an emergency alarm information is provided, instead of the retransmit broadcast signal in an emergency.

2. The broadcast apparatus for the closed space according to claim 1, wherein the transmitter transmits the emergency broadcast signal in an emergency to an adjacent area of the closed space so that its electric field strength becomes a level higher than that of a reception strength of the normal broadcast signal.

3. The broadcast apparatus for the closed space according to claim 1, wherein the transmitter transmits the normal broadcast signal received by the receiver in an emergency to an adjacent area of the closed space so that its electric field strength becomes a level higher than that of a reception strength of the emergency broadcast signal.

* * * * *